US006598795B1

(12) United States Patent
Prenn

(10) Patent No.: US 6,598,795 B1
(45) Date of Patent: Jul. 29, 2003

(54) USE OF BAR CODE TO SPECIFY MEDIA TYPE IN AN IMAGING DEVICE

(75) Inventor: Michael P. Prenn, Star, ID (US)

(73) Assignee: Hewlett-Packard Development Company, LP, Houston, TX (US)

( * ) Notice: Subject to any disclaimer, the term of this patent is extended or adjusted under 35 U.S.C. 154(b) by 0 days.

(21) Appl. No.: 09/556,766

(22) Filed: Apr. 24, 2000

(51) Int. Cl.[7] .................................................. G06K 7/10

(52) U.S. Cl. ............................ 235/462.01; 235/462.02; 235/380; 283/72; 283/113

(58) Field of Search ........................ 235/462.01, 462.02, 235/468, 380; 209/584, 900; 283/72, 113

(56) References Cited

U.S. PATENT DOCUMENTS

| | | | | |
|---|---|---|---|---|
| 3,767,188 A | * 10/1973 | Rosenberg et al. | ......... | 221/287 |
| 4,830,186 A | * 5/1989 | George et al. | .............. | 206/449 |
| 5,053,814 A | 10/1991 | Takano et al. | | |
| 5,568,229 A | * 10/1996 | Szlucha | ...................... | 219/216 |
| 5,703,783 A | * 12/1997 | Allen et al. | ................. | 209/584 |
| 5,713,567 A | * 2/1998 | Owen et al. | ................ | 206/449 |
| 6,011,939 A | * 1/2000 | Martin | ....................... | 219/216 |
| 6,219,153 B1 | * 4/2001 | Kawanabe et al. | ........ | 358/1.16 |
| 6,227,732 B1 | 5/2001 | Higuchi et al. | | |
| 6,267,522 B1 | * 7/2001 | Slippy et al. | ............... | 101/232 |
| 6,386,671 B1 | * 5/2002 | Huston et al. | ......... | 235/462.08 |

FOREIGN PATENT DOCUMENTS

| | | | |
|---|---|---|---|
| EP | 0768566 A2 | | 4/1997 |
| JP | 11091958 A | | 4/1999 |
| JP | 200148379 A | * | 2/2001 |
| JP | 2001139078 A | | 5/2001 |

* cited by examiner

*Primary Examiner*—Michael G. Lee
*Assistant Examiner*—Steven S. Paik
(74) *Attorney, Agent, or Firm*—Leslie G. Murray

(57) ABSTRACT

A method of packaging print media in combination with a printing device enables the printing device to automatically determine the type of media, and its characteristics and attributes, loaded in a media input tray. The print media package includes a pre-cut or perforated line which allows the removal of one end of the package forming a partial package exposing one end of sheets of the print media and encasing the print media. The print media is loaded in the media input tray encased in the partial package with the exposed ends of the print media sheets accessible to the printing device feed roller. The print media package includes an identifying code imprinted on an outside surface of the package located on the remaining portion of the package when the package end has been removed. The media input tray includes a sensor mounted in a location accessible to the identifying code when the print media encased in the partial package is loaded in the media input tray. When the loaded media input tray is inserted in the printing device, the sensor reads the identifying code and transmits the encoded information to the printing device control circuitry where the printing device media settings are updated.

20 Claims, 4 Drawing Sheets

USE OF BAR CODE TO SPECIFY MEDIA TYPE IN AN IMAGING DEVICE

FIELD OF THE INVENTION

The present invention relates generally to image-forming devices such as printers and copiers, and more particularly, to providing to an image-forming device the identification of print media type using a bar code printed on the print media container.

BACKGROUND OF THE INVENTION

In the art of printing, more generally, the forming of images (i.e., text, graphics, etc.) on a print media, it is desirable that the image-forming device know the type of print media, such as paper, for example, loaded in the print media supply or input tray. Given the several characteristics which determine the "type" of print media, such as material, size, color, weight and texture, for example, there are hundreds, if not thousands, of different types of print media available and in use today. Similarly, there are many different types of image-forming devices in use today, such as printers, copiers, scanners, facsimile machines and plotters, for example, many of which require special types of print media.

Consider one of the more important of print media characteristics, media size, for example. Without media size information, an error can occur during printing if the media size requested is not the same as the media size loaded in the media supply tray. If the image-forming device knows the size of the print media available in the media supply tray, the user can be notified that the presently available media does not agree with the requested size, thereby reducing the likelihood of an error.

Today, the most common method used to set or "inform" the image-forming device, such as a printer, of the type of print media contained in a given media supply tray is for a user to provide the media type information via a printer control panel. There is no assurance that once this information is set in the printer, that the setting will remain accurate in the future. For example, User A loads transparency film media in input tray 2 and sets the media type for input tray 2 as "transparencies." At a later time, User B removes the transparency film and loads plain paper in input tray 2 and fails to reset the media type for input tray 2 to reflect the change in print media. Subsequent users expecting to print on transparency film may be disappointed when the print job is printed on plain paper instead thus causing a loss of time and a waste of resources.

Considering again the size of the print media, several methods of conveying the size of print media loaded in a supply tray to a printer have been developed. For example, a unique tray for each size of media that the printing device can accommodate will insure that only one size of media can be loaded in the tray. The primary disadvantage with this approach is increased cost in molding numerous size and configured trays. Additional disadvantages include increased cost in maintaining inventory of numerous trays to support the many media sizes used. For the user, storage of those trays not in current use must also be accommodated. Also, the user generally must purchase, at an additional cost, trays which are not initially provided with the printing device.

Another approach allows a manufacturer to manufacture one type of media tray that can be configured for all of the various sizes of print media. This approach reduces manufacturing cost since it requires only one molding for all media trays. However, the user still must indicate to the printing device the type and size of media loaded in the tray. One method is to provide a single tray which is adjustable to fit each size of media commonly available, the size of the media being provided to the printing device based on what size media the tray has been adjusted to receive. Another common method of indicating to the printing device the size of the media loaded in the tray requires the user to physically "punch out" a particular location in the media tray. Once punched out, the media tray is permanently configured for that particular media size. If the user subsequently wishes to use a different media size, a new tray must be purchased.

Further, in most printing devices, there is no way for a printing device to determine all characteristics for the print media loaded in a media supply tray. Currently, there are a very limited number of combinations of media type characteristics that are provided to and understood by today's printing devices. Typically, these characteristics are media size, letter or legal, for example, and basic material type, paper or transparency, for example.

Accordingly there is a need for a way to automatically provide print media characteristics to a printing device without the necessity for a user to manually input and continually update this information as the print media is changed.

SUMMARY OF THE INVENTION

In a preferred embodiment, the present invention provides a method of packaging print media in combination with a printing device which enables the printing device to automatically determine the type of media, and its characteristics and attributes, loaded in a media input tray. The print media package includes a pre-cut or perforated line which enables the removal of one end of the package forming a partial package encasing the print media and exposing one end of sheets of the print media. The print media encased In the partial package is loaded in the media input tray with the exposed ends of the print media sheets accessible to the printing device feed roller. The print media package includes an identifying code imprinted on an outside surface of the package located on the remaining portion of the package when the package end has been removed. The media input tray includes a sensor mounted in a location accessible to the identifying code when the print media encased in the partial package is loaded in the media input tray. When the loaded media input tray is inserted in the printing device, the sensor reads the identifying code and transmits the encoded information to the printing device control circuitry where the media settings are updated.

In a preferred embodiment of the present invention, a printing device includes one or more media input trays in which print media is loaded for feeding to the printing device on a sheet-by-sheet basis. The print media is encased in a partial package formed by removing one end of the package containing the media thus exposing one end of the sheets of media contained in the media partial package. The print media encased in the partial package is loaded in the media input tray, the exposed end of the media stack contained in the partial package is positioned in the media tray so that the exposed end of the top sheet engages the printing device feed roller. An identifying code is provided on an outside surface of the partial package, the identifying code encoding information which identifies the print media type encased within the partial package. The printing device media input tray includes a sensor mounted in a location accessible to the identifying code on the surface of the partial package. In a preferred embodiment, the identifying code is a bar code imprinted on the partial packageouter surface and the sensor is, an optical bar code reader. The sensor reads the encoded information and transmits it to a memory coupled to the sensor where the encoded information is stored. In a preferred embodiment, the memory is a non-volatile random access memory (NVRAM) and the encoded information is stored in a loop table indexed by the media type. The printing device further includes E controller which controls the operation of the printing device. The controller is coupled to the sensor and to the memory and retrieves the encoded information from the memory and updates the printing device media settings upon the occurrence of any one of several predetermined events, such as power up, reset, change of selected media input tray Or the opening and subsequent closing of a media input tray, for example.

Other embodiments and advantages of the present invention will be readily appreciated as the same become better understood by reference to the following detailed description, taken in conjunction with the accompanying drawings. The claims alone, not the preceding summary or the following detailed description, define the invention.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the following detailed description illustrate by way of example the principles of the present invention. The components in the drawings are not necessarily to scale, emphasis instead being placed upon clearly illustrating the principles of the present invention. In the drawings like reference numbers indicate identical or functionally similar elements throughout the several views thereof, and wherein.

DETAILED DESCRIPTION OF THE INVENTION

Figure 1:
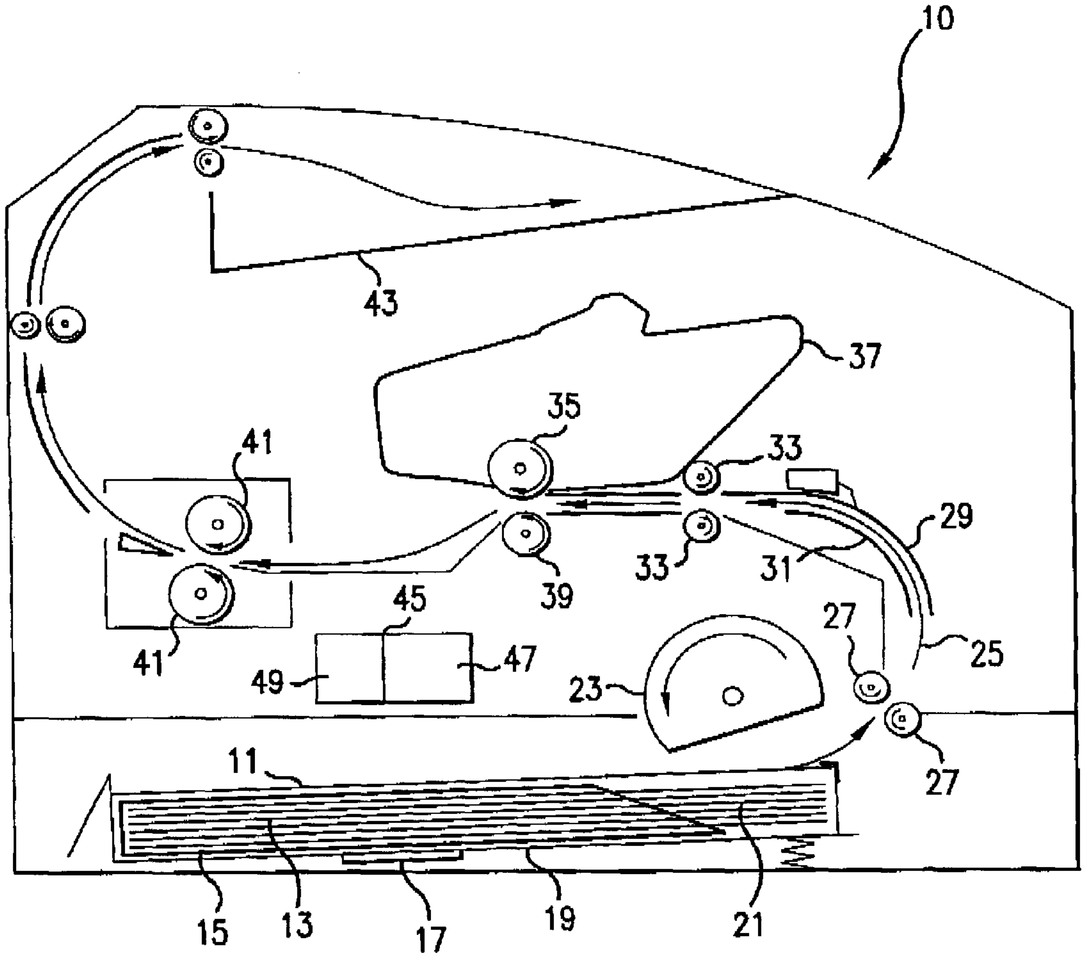
FIG. 1 is a schematic diagram of a laser printer adapted to carry out the present invention.

As shown in the drawings for purposes of illustration, the present invention is preferably embodied in a printing device, such as a laser printer, wherein a print media supply tray or bin includes an image-reading sensor adapted to read a bar code or other identifying image printed or otherwise marked on a print media package or container and provide the media type and characteristics to the printer controller. Typically, in most existing printing devices only limited information, such as size and media material, are provided to the printer via user input or mechanical means such as specific media tray characteristics, for example.

Figure 2A:
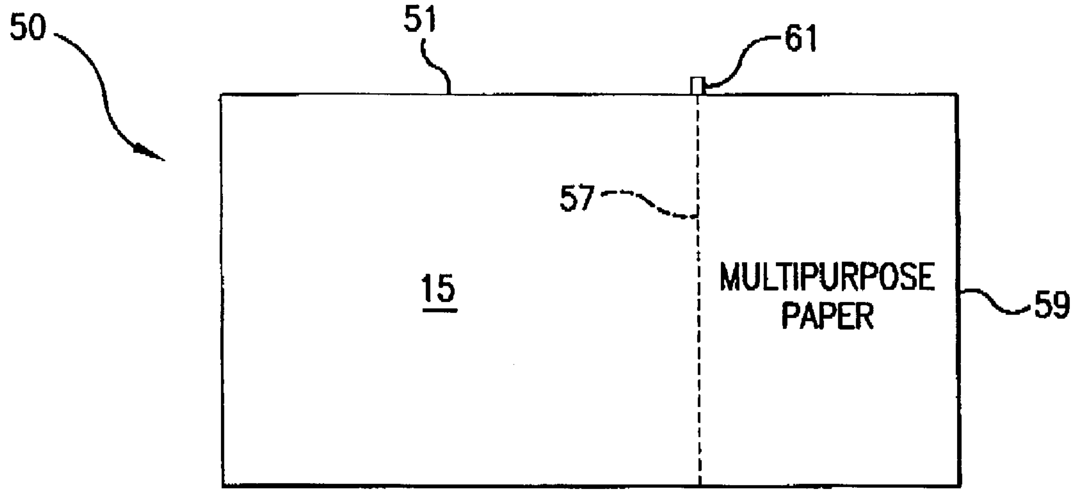
FIGS. 2A, 2B and 2C are views of the top, side and bottom, respectively, of a preferred embodiment of print media packaging according to principles of the present invention.
Figure 2B:
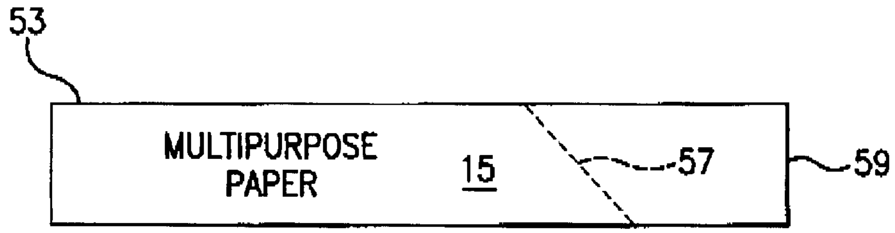
Figure 2C:
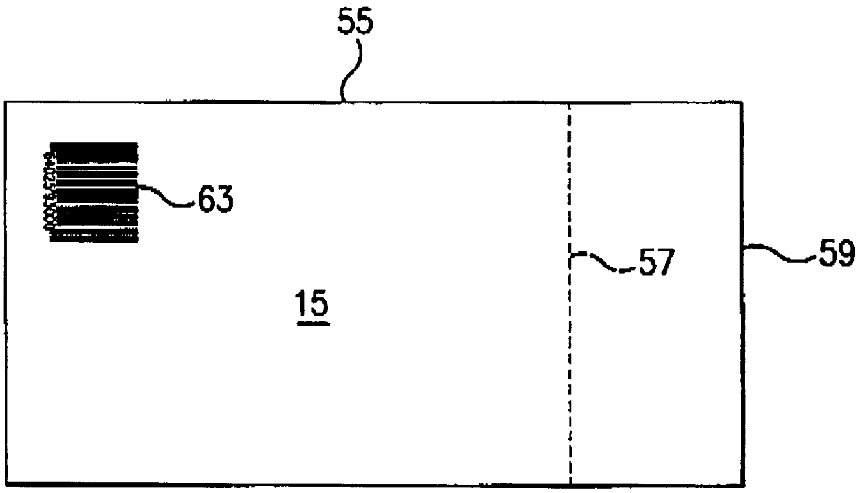

The present invention may be embodied in any image-forming device and is not limited to any specific embodiments illustrated herein. Referring now also to FIG. 1, a schematic block diagram of a laser printer 10 adapted to carry out a preferred embodiment of the present invention is shown. Input paper tray 11 holds sheets of print media 13 contained in partial media package 15. Partial media package 15 includes an identifying image, such as a bar code, (as shown in FIG. 2C) printed or otherwise marked on the outside of the package 15. In a preferred embodiment, the identifying image is marked on the outside surface of the bottom of the partial package 15, but may also be located at other positions on the package, such as on the end or sides of the package, for example. The identifying image contains encoded information identifying the type of media contained in the partial package 15. The encoded information may also include selected media characteristics and attributes such as media size, material, weight, color and the like, for example. Input paper tray 11 includes an image reader 17, such as a bar code reader, mounted in the bottom 19 aligned with the identifying image on the bottom surface of the partial package 15 when the print media is loaded in the paper tray 11. An end of the media package is removed to form the partial media package 15 such that when the partial media package is placed in the paper tray 11, one end 21 of the media stack 13 is exposed for cooperation with feed roller 23. Feed roller 23 picks top sheet 25 from media stack 13 in input tray 11 and advances it to a pair of transport rollers 27. Transport rollers 27 further advance sheet 25 through paper guides 29 and 31 toward registration rollers 33. Registration rollers 33 advance paper sheet 25 to the photoconductive drum 35 (of toner cartridge 37) and transfer roller 39 where toner is applied as is conventional in the art. Sheet 25 then moves through heated fuser rollers 41 toward an output paper bin 43. The printer 10 further includes control circuitry and firmware 45 including a memory 47 for storing required information and allocations to operate the printer and process print jobs, and a controller 49 which controls the printer 10 operations.

Print media, such as paper, for example, is typically provided wrapped in heavy paper or other material forming a secure package to contain and protect the print media during shipment and storage. Print media is generally packaged with one ream (i.e., 500 sheets) to a package. Typically, in the prior art, the media is removed from the package prior to loading in an input tray 11 for input to a printer 10. Referring now also to FIGS. 2A, 2B and 2C, top, side and bottom views, respectively, of a preferred embodiment of print media packaging are shown. While the media packaging shown in FIGS. 2A and 2B are labeled "Multipurpose Paper", it should be understood that the print media packaging is not limited to paper and may contain any type of print media. In a preferred embodiment, print media is contained in a packing 50 having a top 51, a side such as illustrated in side view 53 and a bottom 55 and two ends (not shown). The paper 50 is pre-cut or scribed across the top 51, the bottom 55 and both sides 53 to allow one end of the package 50 to be removed while leaving the remainder of the package 50 intact and forming a partial package 15 (as shown in FIG. 1). In a preferred embodiment, the package 50 is perforated along dashed line 57 approximately one-quarter of the length of the package 50 from one end to allow an end portion 59 of the package to be torn away to form the partial package 15. In one preferred embodiment, a pull tab 61 is provided. Using tab 61 and tearing along perforated line 57, a user separates end portion or endcap 59 from the package 50, leaving the ends of the sheets of the print media exposed with the remainder 15 of the package 50 encasing the media stack 13. The user then inserts or loads the entire ream of print media encased in the partial package 15 into the input paper tray 11 (as shown in FIG. 1) with the open, exposed end 21 of the media stack positioned towards the feed roller 23.

With continuing reference to FIG. 2C, an Identifying image 63 is Imprinted on the outside surface of the package bottom 55. In a preferred embodiment, the identifying Image is a bar code 63, encoding selected information, as is known in the art, relative to the print media contained within the package 50. While the identifying image 63 is preferably imprinted on the outside surface of the package bottom 55, alternatively, it may be located anywhere on the outside surface of the partial package 15, the remaining end (not shown) or either of the sides 53, for example, consistent with the configuration of the input tray 11 or the printing device 10.

Figure 3A:
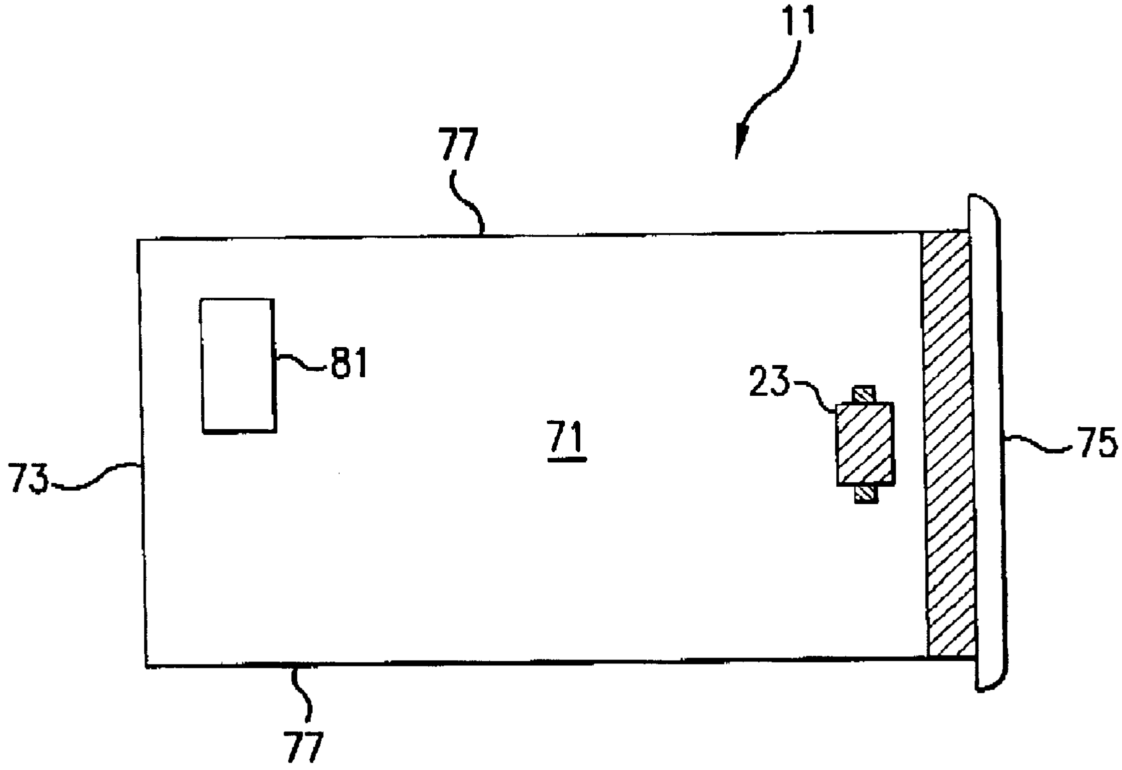
FIGS. 3A and 3B are views of the top and side, respectively, of a print media tray according to the principles of the present invention.
Figure 3B:
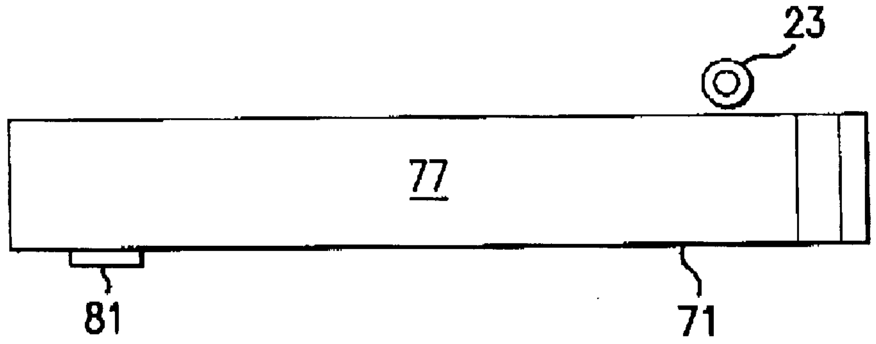

Referring now also to FIGS. 3A and 3B, top and side views , respectively, of a print media tray according to the present invention are shown. Print media tray 11 includes a bottom piece 71 and upward extending rear 73, front 75 and two side 77 walls, to form an enclosure, open at the top, to hold print media loaded therein. The front wall 75 is generally adapted to allow removal from and replacement in the printer. The media tray 11 also includes feed roller 23 located near one end of the media tray 11 to engage and feed sheets of media, one-by-one, to the printer (as described in more detail with reference to FIG. 1). In a preferred embodiment, print media tray 11 is adapted to include a sensor 81, such as a bar code reader as is known in the art, to read the information encoded in identifying image 63. The sensor 81 is located to be aligned with the identifying image 63 imprinted on the print media partial package 15 when loaded in the media tray 11. In a preferred embodiment, the identifying image 63 is imprinted on the bottom of the partial package 15, and the sensor 81 is installed in a corresponding location in the bottom piece 71 of the media tray 11. Alternately, the sensor 81 may be installed at locations in the media tray 11 end 73, 75 or side 77 walls consistent with the position of the imprinted identifying image 63 on the partial package 15.

With continuing reference to FIGS. 2C, 3A and 3B, in another preferred embodiment, the identifying image 63 includes one or more electrical conductors, such conductors made of copper or aluminum, for example, as arranged in a given pattern and embedded in the bottom 55 surface or the partial package 15. Similarly, then, the sensor 81 is preferably one or more open switches arranged in a corresponding pattern and installed in the bottom piece 71 of the media tray 11. When the print media enclosed in the partial package 15 is loaded in the media tray 11, the conductors will align with certain of the open switches to encode the media type contained in the partial package 15. Given n switches, $2^n$ possible media types are allowed.

Figure 4:
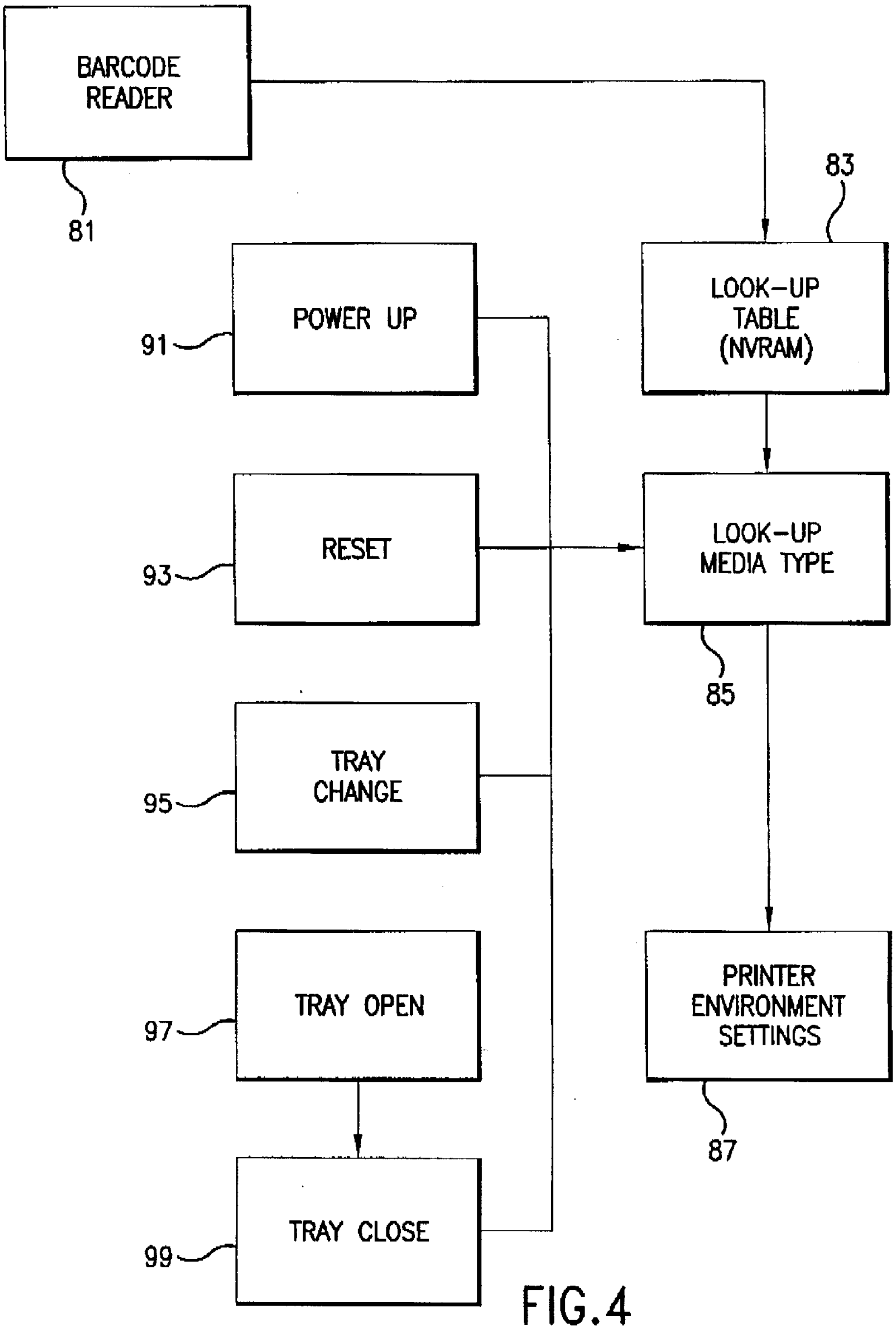
FIG. 4 is a diagram illustrating the operation of the print media identification system according to the principles of the present invention.

Referring now also to FIG. 4, a diagram illustrating the operation of the print media identification system according to the present invention is shown. The sensor 81 reads the identifying image 63 imprinted on the partial package 15 and transmits or sends the encoded information representing the media type to the printer controller 85. The printer controller 85 then goes to a look-up table stored in the printer memory, such as non-volatile random access memory (NVRAM) 83, for example, which matches the media type value to the media and returns the values for the various selected media characteristics. The values for the characteristics of each media type compatible with the printer can be loaded in the NVRAM 83 at the time of the printer manufacture or by a user for each type of media to be used. For example, media characteristics or attributes may include media material, size, color, weight, special use, and the like, for example. For example, the media type characteristics may be supplied by media manufacturers, and compiled and distributed on a computer-readable media, such as a CD-ROM, for example. As new or alternative print media becomes available, media type, characteristics and attributes information can be added or updated in the NVRAM 83.

Alternatively, in another preferred embodiment, the information encoded in the identifying image 63 can include all of the media characteristics and attributes of interest as well as identifying the media type. When the sensor 81 reads the identifying image 63, the encoded information is transmitted to NVRAM 83 and stored in the look-up table. At the NVRAM, the encoded information will update any media information corresponding to the encoded media type already stored; if the encoded media type is a new media, i.e., not already in the look-up table, a new entry and file for the encoded media type is opened. In a preferred embodiment, the media information stored in the look-up table is indexed by media type.

The printer controller 85 then updates the printer media settings based on the media input tray 11 presently selected. The printer controller 85 updates the printer media settings at power-up 91 or a reset 93 of the printer. The controller 85 will also update the printer media settings anytime the media input tray 11 is changed 95, such as when a user submits a print job calling for a different type media than that loaded in the presently selected media input tray, or when an input tray is opened or removed 97 and then subsequently closed or replaced 99, such as when a user changes the media type loaded in a selected media input tray, for example.

While having described and illustrated the principles of the present invention with reference to various preferred embodiments and alternatives, it will be apparent to those familiar with the art that the invention can be further modified in arrangement and detail without departing from those principles. Accordingly, it is understood that the present invention includes all such modifications that come within the terms of the following claims and equivalents thereof.

What is claimed:

1. A method for identifying a print media type loaded in a media tray of a printing device, the media tray receiving print media and having a sensor mounted therein, the print media being provided in a print media package formed of a material forming a secure package to contain and protect the print media during shipment and storage, the print media package comprising an identifying code on one of the surfaces thereof, the identifying code encoding information concerning the print media encased within the package including at least the print media type, the method comprising the steps of:

removing one end of the package to form a partial package having the identifying code, and inserting the partial package into the media tray;

sensing the information encoded in the identifying code; and updating the printing device media settings based on the information encoded in the identifying code.

2. The method as in claim 1 wherein the identifying code comprises an identifying image imprinted on the outside surface of the package.

3. The method as in claim 2 the identifying image comprises a bar code.

4. The method as in claim 1 wherein the printing device further includes a memory, the step of sensing the information encoded in the identifying code includes the step of transmitting the media information to the memory.

5. The method as in claim 4 wherein the memory comprises non-volatile random access memory, the media information being stored in a look-up table indexed by the media type.

6. The method as in claim 1 wherein the information encoded in the identifying code concerning the print media further includes media characteristics and attributes describing the media type encased within the package.

7. The method as in claim 6 wherein the encoded information includes at least the media size and the media material.

8. The method as in claim 1 wherein the printing device further includes a printing device controller, the printing device controller reading the identifying code and updating the printing device media settings whenever the printing device is powered up or reset.

9. The method as in claim 8 wherein the printing device controller reads the identifying code and updates the printing device media settings whenever the media tray is changed, or opened and subsequently closed.

10. A printing device including at least one media tray for receiving print media, the print media being provided in a print media package formed of a material forming a secure package to contain and protect the print media during shipment and storage, the print media package comprising an identifying code on one of the surfaces thereof, the identifying code encoding information concerning the print media encased within the package, the media tray receiving the print media encased in a partial package obtained by removing one end of the package, the printing device comprising:

a sensor mounted in the print media tray for reading the encoded information;

a memory coupled to the sensor for receiving and storing the encoded information; and a printing device controller coupled to the sensor and the memory for retrieving the encoded information from the memory and updating the printing device media settings upon the occurrence of any one of several predetermined events.

11. The printing device of claim 10 wherein the encoded information includes at least the type of media encased within the package.

12. The printing device of claim 11 wherein the encoded information further includes characteristics and attributes describing the media type, including at least media size and media material.

13. The printing device of claim 10 wherein the identifying code comprises an identifying image imprinted on an outer surface of the package.

14. The printing device of claim 13 wherein the identifying image comprises a bar code.

15. The printing device of claim 10 wherein the memory comprises non-volatile random access memory, the encoded information being stored in a look-up table indexed by the media type.

16. The printing device as in claim 10 wherein the printing device controller causes the sensor to read the encoded information and retrieves from the memory the media characteristics based on the media type identified in the encoded information and updates the printing device media settings whenever the printing device is powered up, the printing device is reset, a selected media tray is changed, or a media tray is opened and subsequently closed.

17. A printing device including at least one media tray for receiving print media, the print media being provided in a print media package formed of a material forming a secure package to contain and protect the print media during shipment and storage, the print media package comprising an identifying code on one of the surfaces thereof, the identifying code encoding information concerning the print media encased within the package, the media tray receiving the print media encased in a partial package obtained by removing one end of the package wherein the identifying code comprises one or more electrical conductors arranged in a predetermined pattern, the one or more electrical conductors being embedded in the surface of the package, the printing device comprising:

a sensor mounted in the print media tray for reading the encoded information;

a memory coupled to the sensor for receiving and storing the encoded information; and a printing device controller coupled to the sensor and the memory for retrieving the encoded information from the memory and updating the printing device media settings upon the occurrence of any one of several predetermined events.

18. The printing device of claim 17 wherein the one or more electrical conductors are embedded in a bottom surface of the package.

19. The printing device of claim 17 wherein the one or more electrical conductors are made of copper or aluminum.

20. The printing device of claim 17 wherein the sensor comprises one or more open switches arranged in a pattern corresponding to the predetermined pattern of the one or more electrical conductors.

* * * * *